United States Patent
Amada et al.

(10) Patent No.: US 9,092,050 B2
(45) Date of Patent: Jul. 28, 2015

(54) CHECKOUT DEVICE WITH MULTI-TOUCH INPUT DEVICE

(75) Inventors: Janry C. Amada, Cebu (PH); Donald A. Collins, Jr., Buford, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/484,456

(22) Filed: May 31, 2012

(65) Prior Publication Data

US 2013/0320084 A1 Dec. 5, 2013

(51) Int. Cl.
| | |
|---|---|
| G06K 15/00 | (2006.01) |
| G06F 3/01 | (2006.01) |
| G06Q 20/20 | (2012.01) |
| G06Q 50/10 | (2012.01) |
| G06Q 50/12 | (2012.01) |
| G06F 1/16 | (2006.01) |
| G06F 3/042 | (2006.01) |

(52) U.S. Cl.
CPC ............... *G06F 3/01* (2013.01); *G06F 1/1684* (2013.01); *G06F 3/0421* (2013.01); *G06F 3/0425* (2013.01); *G06Q 20/208* (2013.01); *G06Q 50/10* (2013.01); *G06Q 50/12* (2013.01); *G06F 2203/04105* (2013.01)

(58) Field of Classification Search
USPC ........... 235/383, 385, 462.01, 462.14, 462.45
See application file for complete search history.

(56) References Cited

U.S. PATENT DOCUMENTS

| | | | | | |
|---|---|---|---|---|---|
| 4,632,199 | A | * | 12/1986 | Ober et al. ................... | 177/238 |
| 4,971,176 | A | * | 11/1990 | Nojiri et al. .................. | 186/61 |
| 6,543,684 | B1 | * | 4/2003 | White et al. .................. | 235/379 |
| 6,644,547 | B1 | * | 11/2003 | White ........................... | 235/381 |
| 2007/0012307 | A1 | * | 1/2007 | Wiker et al. ................. | 126/21 A |
| 2009/0322706 | A1 | * | 12/2009 | Austin ........................... | 345/175 |
| 2010/0049616 | A1 | * | 2/2010 | Hipsher ......................... | 705/21 |
| 2010/0059589 | A1 | * | 3/2010 | Goncalves et al. ............ | 235/383 |
| 2010/0217678 | A1 | * | 8/2010 | Goncalves ..................... | 705/22 |
| 2011/0269085 | A1 | * | 11/2011 | Wiker et al. ................... | 432/4 |
| 2012/0030566 | A1 | * | 2/2012 | Victor ........................... | 715/702 |
| 2012/0050807 | A1 | * | 3/2012 | Noda et al. ................... | 358/1.15 |
| 2012/0131488 | A1 | * | 5/2012 | Karlsson et al. .............. | 715/771 |

* cited by examiner

*Primary Examiner* — Tuyen K Vo

(74) *Attorney, Agent, or Firm* — Paul W. Martin; Joseph P. Mehrle

(57) ABSTRACT

A checkout device including a multi-touch surface display which can also weigh items. An example checkout device includes a surface element for displaying transaction screens and for receiving touch inputs during a transaction, and a load cell below the surface element for producing a weight signal corresponding to a weight of an item of the transaction on the surface element.

14 Claims, 5 Drawing Sheets

CHECKOUT DEVICE WITH MULTI-TOUCH INPUT DEVICE

BACKGROUND

The present invention relates to checkout systems and methods and more specifically to a checkout device with a multi-touch input device.

A multi-touch input device recognizes two or more simultaneous touches, allowing a user to interact with a computer through various finger gestures on a surface of the multi-touch input device. Multi-touch finger gestures may include swipes, pinches, rotations, and other actions.

Microsoft Surface is a computing platform that is capable of multi-touch input. It includes a rear projection display and infrared or near-infrared (IR) cameras that can see fingers and objects placed on the display.

Conventional point-of-sale terminals typically include a keyboard and display (or a touch screen), and a plurality of separate peripherals including a cash drawer, one or more barcode readers, a scale (which may be integrated into the barcode reader), a card reader, a signature pad, and a printer. Adding multi-touch technology to a conventional point-of-sale terminal would add cost, cost that retailers may be unwilling to support despite the benefits of multi-touch input.

However, retailers wish to reduce transaction time and expedite the customer checkout process. Therefore, it would be desirable to provide a checkout device designed from the ground up to include multi-touch input technology.

SUMMARY

In accordance with the teachings of the present invention, a checkout device with a multi-touch input device is provided.

An example checkout device includes a surface element for displaying transaction screens and for receiving touch inputs during a transaction, and a load cell below the surface element for producing a weight signal corresponding to a weight of an item of the transaction on the surface element.

An example method of operating a checkout device with a multi-touch input display to perform a transaction includes displaying a transaction screen from a computer by the multi-touch input display, receiving operator touches by the multi-touch input display within the transaction screen, producing weight information corresponding to a weight of a first item of the transaction on a top surface of the multi-touch input display by a load cell below the multi-touch input display and sending the weight information to the computer, and capturing images of second items adjacent the top surface of the multi-touch input display by imagers around the multi-touch input display and providing the images of the second items to the computer, wherein some of the images of the second items contain barcodes.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
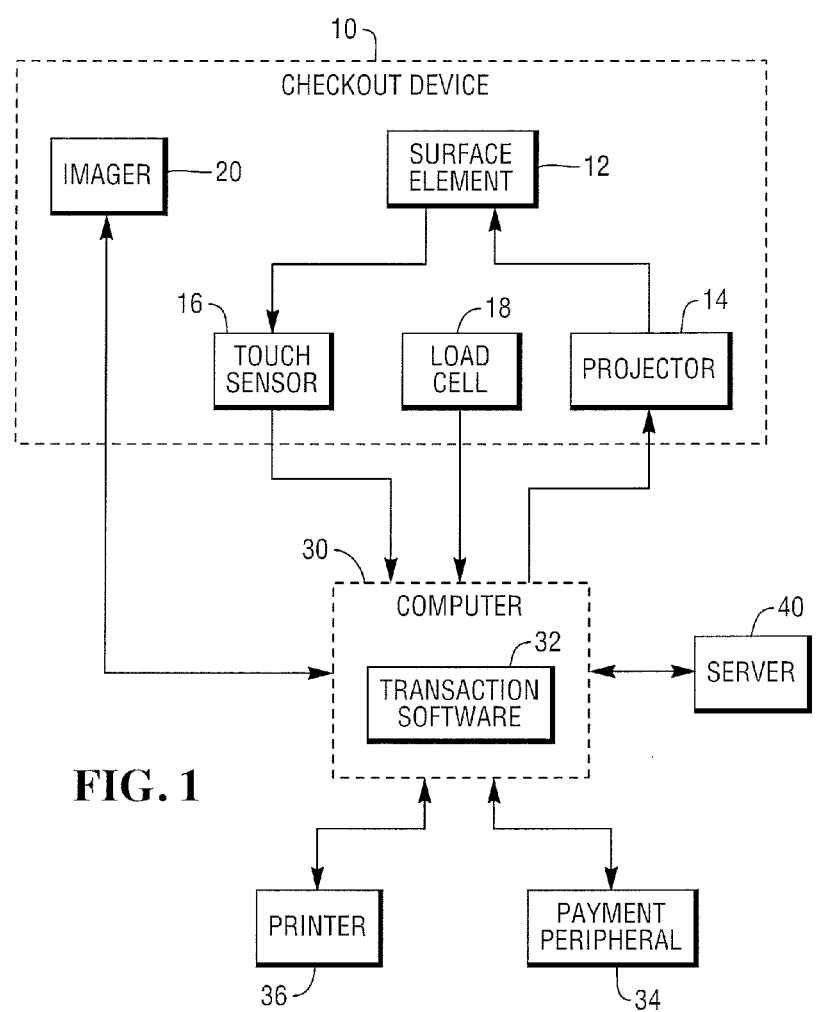
FIG. 1 is a block diagram illustrating an example checkout device with a multi-touch input device.
Figure 2:
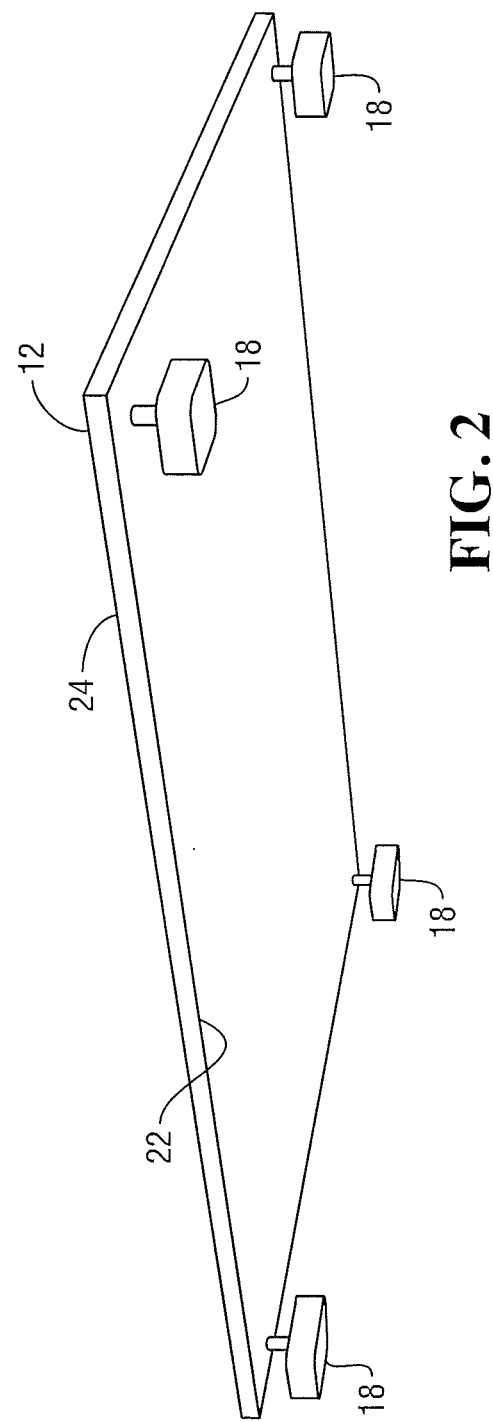
FIG. 2 is a perspective view of a load cell arrangement under a surface element of the example checkout device.

With reference to FIGS. 1-4, an example checkout device 10 includes surface element 12, projector 14, touch sensor 16, load cell 18, and imager 20.

Surface element 12 acts as a display and touch input interface. Surface element 12 is generally flat and is oriented generally horizontally. Surface element 12 also acts as a weigh plate.

In one example embodiment, surface element 12 is made of semi-opaque materials which can diffuse light. The materials in surface element 12 preferably make surface element 12 durable, resistant to scratching and denting. An example material or materials include a damage resistant glass, including but not limited to scratch resistant coated glass designed for use in barcode scanners or electronic glass used in smart phones and other multi-touch input devices. Coatings and laminates may include diamond-like (amorphous diamond) and sapphire coatings, such as those in scanner glass products from Morgan Ceramics company.

Alternatively, surface element 12 may be made of a relatively inexpensive float glass and be replaced when it becomes scratched to an operator's threshold for minimal viewability.

Figure 3:
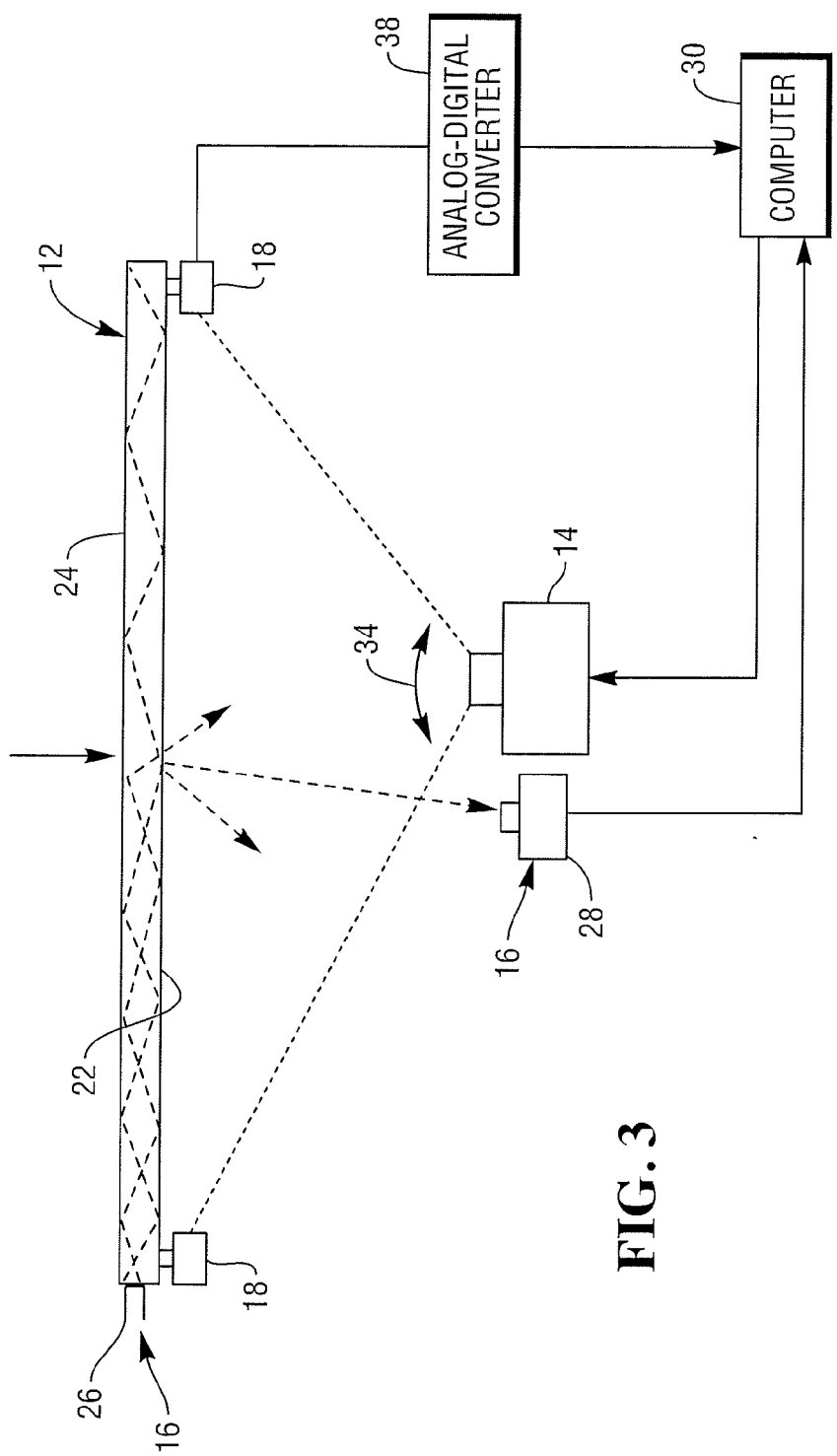
FIG. 3 is a diagrammatic view illustrating an example embodiment of the checkout device.

Projector 14 is a rear projection display that displays screens from computer 30 onto a bottom surface 22 of surface element 12. The display screens pass through surface element 12 and appear as visible to an operator viewing a top surface 24 of surface element 14. Projector 14 has a usable viewing angle 34 sufficient to cover substantially all of bottom surface 22 (FIG. 3).

Touch sensor 16 senses one or more input selections and movements of fingers and objects placed on the surface element 12 and sends input signals to computer 30. In one example embodiment, touch sensor 16 captures customer signatures for credit card purchases.

In one example embodiment (FIG. 3), touch sensor 16 includes one or more infrared or near-infrared light emitting diodes (LEDs) 26 and one or more infrared or near-infrared cameras 28. LEDs 26 produce infrared scan lines within surface element 12. The infrared scan lines are substantially parallel and travel horizontally through surface element 12. When a finger or item is placed on surface element 12, the infrared scan lines are interrupted and the infrared light diffuses in different directions. Infrared camera 28 captures images of bottom surface 22 and sends the images to computer 30 for processing. The images include one or more points associated with finger and object touches, such as product and stylus touches, where the infrared scan lines were disrupted.

Load cell 18 senses weights of items placed on surface element 12. In one example embodiment (FIG. 2), a plurality of load cells 18 sense the weight, with one load cell 18 located at of each corner of bottom surface 22 of surface element 12. Load cell 18 sends weight signals to computer 30 for processing. In an example embodiment, load cell 18 sends weight signals through analog to digital converter 38.

Transaction software 32 may use the weight information in the weight signals to determine the price of a per unit weight item. Transaction software 32 may also use the weight information to verify the identity of an item and/or for security purposes.

Imager 20 captures images of items adjacent top surface 24 of surface element 12 for the purpose of identifying the items. For example, transaction software 32 may identify an item by reading a barcode on the item in the captured images. Alternatively, transaction software 32 may identify the item by analyzing the captured images for color, shape, size, and other features of the item. The later method of operation may be better suited for identifying produce items and other non-barcode items.

In one example embodiment (FIGS. 4-5), a plurality of imagers 20 capture images, with one imager 20 located adjacent each corner of top surface 24 of surface element 12. Each imager 20 may be aimed at a slight upward angle to capture images of items on or above surface element 12. The fields of view of imagers 20 overlap to create a capture zone 44 over surface element 12. Imagers 20 send captured images to computer 30 for processing.

Figure 5:
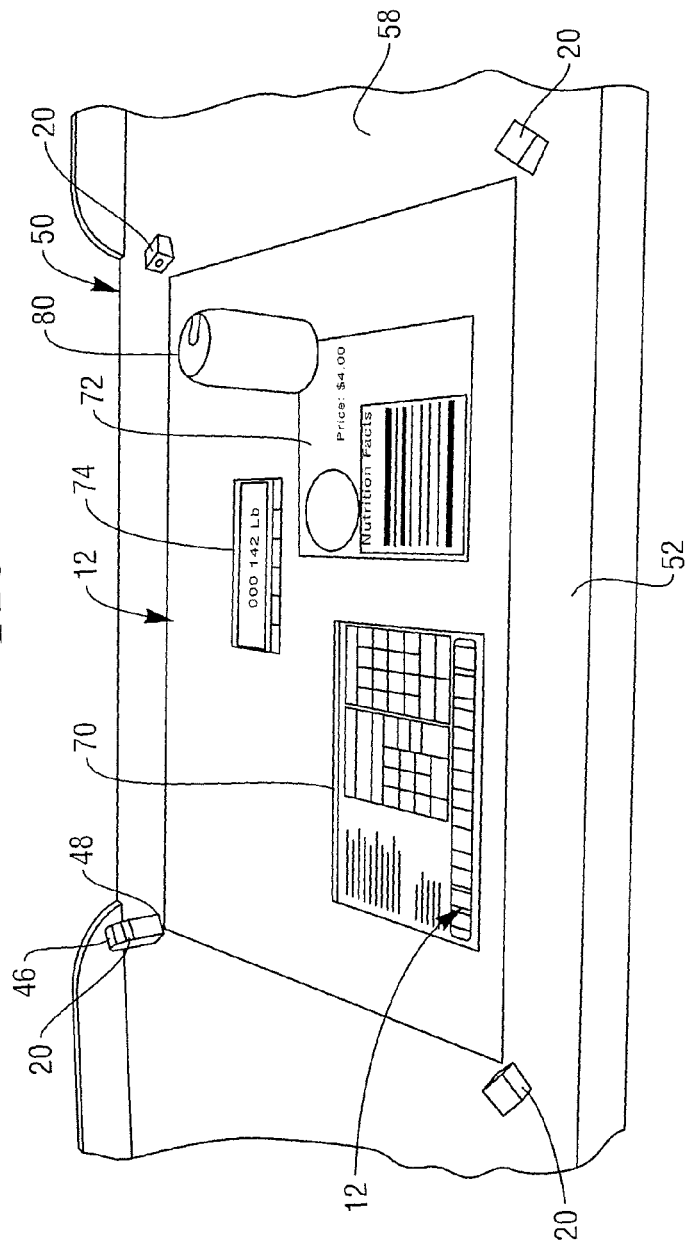
FIG. 5 is a perspective view of a center portion of the example checkout stand.

A further enhancement to the example embodiment is that one of imagers 20 includes a handheld scanner 46 which is removable from docking aperture 48 in checkout stand 50 (FIG. 5). When removed, handheld scanner 46 can be used by an operator to capture images of items that cannot conveniently be placed on surface element 12. Handheld scanner 46 may also be placed in docking aperture 48 to face away from surface element 12 to facilitate scanning of customer driver's licenses, for example. Handheld scanner 46 may communicate with computer 30 via a wireless connection, such as a Bluetooth connection, or via a cable which recesses into checkout stand 50 when handheld scanner 46 is docked with docking aperture 48. Handheld scanner 46 may send raw image information or decoded barcode information to computer 30, which combines processing of either type of data with processing of data from other imagers 20.

Computer 30 executes transaction software 32 which provides transaction screens to projector 14 for guiding an operator through a transaction, receives operator inputs and selections during the transaction from touch sensor 16, receives weight signals from load cell 18, and receives captured images from imager 20. Transaction software 32 further processes the weight signals to determine prices of weighed items and the captured images to obtain barcode and/or other identifying information and prices of items. Transaction software 32 may obtain the price information from a price look-up file at server 40.

Transaction software 32 may include one or more different software modules for processing signals to or from projector 14, touch sensor 16, load cell 18, and imager 20. Transaction software 32 may also off load all or some processing to another computer, such as server 40.

Computer 30 includes one or more processors, memory, and program and data storage. Computer 30 may execute an operating system such as a Microsoft or other operating system. Computer 30 may execute other computer software, such as a Microsoft or other surface computing software product, that may be stored in a computer readable medium, such as a memory. Computer 30 may be coupled to other computers, including server 40, via a network. Computer 30 further includes graphics circuitry for providing display screens to projector 14, network circuitry for connecting to the network, and other circuitry for connecting to other peripherals, such as a card reader, cash drawer, or other payment peripheral 34 and a printer 36 for printing receipts.

Figure 4:
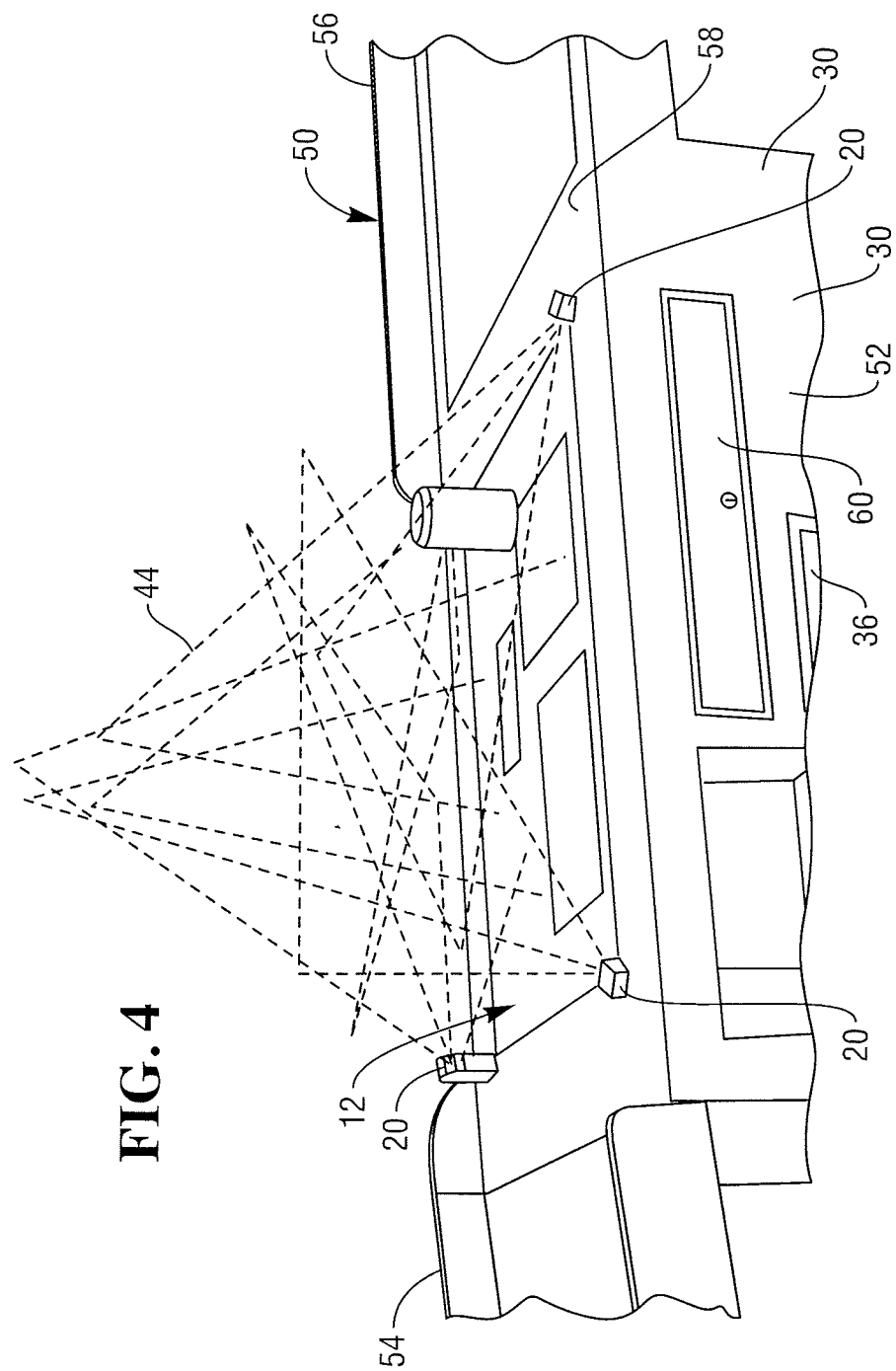
FIG. 4 is a perspective view illustrating an example checkout stand with the example checkout device.

With reference to FIG. 4, an example checkout stand configuration is illustrated. Example checkout stand 50 may be operated in an assisted mode of operation by a store employee or in a self-service mode of operation by a customer.

Example checkout stand 50 includes a center portion 52 and two end portions 54 and 56.

Center portion 52 contains checkout device 10 and may include other peripherals, such as payment peripheral 34 and printer 36. For example, center portion 52 may include cash drawer 60 controlled by computer 30.

Checkout device 10 is mounted within center portion 52 with top surface of surface element 12 substantially flush with top surface 58 of center portion 52.

End portions 54 and 56 may include any conveyors and/or product staging shelves.

With reference to FIG. 5, transaction software 32 displays various transaction screens during a transaction. Each screen may be moveable by an operator to a different location on surface element 12. Example screens include screens 70-74.

Example screen 70 is a primary transaction screen for the operator to process the transaction. The example screen 70 may include various types of transaction function selections and transaction information.

Example screen 72 includes information about a product 80 on surface element 12. The information may include price, nutritional information, and/or promotional information.

Example screen 74 includes weight information processed from weight signals by transaction software 32.

During an example transaction, the operator refers to screen 70 and makes selections when necessary. Transaction software 32 sends screen 70 and other screens to projector 14 for display. Transaction software 32 may send some screens, such as promotion screens, automatically for customer viewing.

Touch sensor 16 captures operator touches and sends touch signals to transaction software 32 for processing. Touch sensor 16 may record finger touches representative of operator selections in screen 70 and operator swipes, pinches, rotations, and other actions to manipulate screens displayed by projector 14.

The operator scans items with barcodes selected by a customer for purchase. The operator scans the items by moving the items through capture zone 44 created by imagers 20. Each time an operator scans an item, imagers 20 capture images of whatever is in capture zone 44 and send the images to transaction software 32 for processing. Transaction software 32 analyzes the captured images to determine whether any of the captured images contain barcode information, and if they do, transaction software 32 decodes the barcode information, and sends decoded barcode information to server 40 for a price of the item associated with the barcode in the price look-up file. Transaction software 32 adds the price of the item to the transaction. The operator continues scanning items until all items are identified.

If the customer has purchased an item that is too big or bulky to fit on surface element 12, the operator may remove handheld scanner 46 from docketing aperture 48 to scan the item. Handheld scanner 46 may send raw image information or decoded barcode information to transaction software 32. Transaction software 32 decodes the raw barcode information, if necessary, and sends the decoded barcode information to server 40 for a price of the item associated with the barcode in the price look-up file. Transaction software 32 adds the price of the item to the transaction. After scanning the operator returns handheld scanner 46 to docking aperture 48.

The operator also weighs produce items purchased by the customer by placing the produce items on surface element 12. Load cells 18 sense the weight of the produce item and send weight signals to transaction software 32 for processing. An operator may identify the produce item by making a selection in screen 70. In addition, or as an alternative, transaction software 32 may identify the produce item from the captured images from imagers 20, and may also use the weight information to assist with identification. Transaction software 32 obtains the price per unit weight from server 40, calculates the total price, and adds the total price to the transaction.

After transaction software 32 has added all of the items to the transaction, transaction software 32 completes payment via one or more payment peripherals 34 and prints a receipt using printer 36. For example, if the customer pays with currency and/or coins, the operator uses a cash drawer to store the currency and/or coins and provide any change.

As another example, if the customer pays with a credit card, the customer swipes the credit card through a card reader. Transaction software 32 signals projector 14 to display a digital receipt screen on surface element 12, facing the customer. The customer applies a signature to a signature line within the digital receipt screen by writing with a stylus on surface element 12. Touch sensor 16 captures the signature and sends touch signals to transaction software 32 for processing. Transaction software 32 stores the digital receipt with the signature as part of a record of the transaction.

Although the present invention has been described with particular reference to certain preferred embodiments thereof, variations and modifications of the present invention can be effected within the spirit and scope of the following claims.

What is claimed is:

1. A checkout device comprising:
   a surface element for displaying transaction screens and for receiving touch inputs during a transaction, each screen movable to a different location on the surface element, and wherein the transaction screens include: a primary transaction screen configured for an operator to process the transaction, a product screen having product information relevant to the transaction, a weight screen having weight information for any product being weighed during the transaction, and a receipt screen having receipt information for the transaction and the receipt screen configured to receive a signature input from a customer of the transaction;
   a load cell below the surface element for producing a weight signal corresponding to a weight of an item of the transaction on the surface element; and
   sensing input selections and movements of fingers on the surface element and sensing objects placed on the surface element.

2. The checkout device of claim 1, wherein the surface element records a plurality of substantially simultaneous touch inputs.

3. The checkout device of claim 1, further comprising an imager for capturing an image of the item and for providing the image to a computer.

4. The checkout device of claim 1, further comprising a barcode reader for scanning barcoded items adjacent a top surface of the surface element and for providing barcode information to a computer.

5. The checkout device of claim 4, wherein the barcode reader comprises a plurality of imaging optical barcode readers around the surface element.

6. The checkout device of claim 1, further comprising a projector for projecting the transaction screens from a computer on a bottom surface of the surface element.

7. The checkout device of claim 1, further comprising a touch sensor for recording the touch inputs and providing touch input signals to a computer.

8. The checkout device of claim 7, wherein the touch inputs comprise a signature of the customer involved in the transaction.

9. A checkout device comprising:
   a multi-touch input display for substantially simultaneously displaying a plurality of transaction screens from a computer and for receiving touch inputs, including a customer signature during a transaction, each screen movable to a different location on the multi-touch input display, and wherein the transaction screens include: a primary transaction screen configured for an operator to process the transaction, a product screen having product information relevant to the transaction, a weight screen having weight information for any product being weighed during the transaction, a receipt screen having receipt information for the transaction and the receipt screen configured to receive the customer signature from the customer;
   a plurality of load cells below the multi-touch input display for producing weight information corresponding to a weight of a first item of the transaction on a top surface of the multi-touch input display and for sending the weight information to the computer; and a plurality of imagers around the multi-touch input display for capturing images of second items adjacent the top surface of the multi-touch input display and for providing the images to the computer, wherein some of the images contain barcodes, wherein the multi-touch input display both senses input selections and movements of fingers on the multi-touch input display and senses objects placed on the multi-touch input display.

10. The checkout device of claim 9, wherein one of the imager is removable, and when removed operates as a hand-held barcode reader.

11. The checkout device of claim 9, wherein the imagers also capture images of the first item and send the images to the computer.

12. A method of operating a checkout device with a multi-touch input display to perform a transaction comprising:
   displaying a transaction screen from a computer by the multi-touch input display; permitting the transaction screen to be moved to a different location within the multi-touch input display relative to other transaction screens displayed on the multi-touch input display, the transaction screen configured for an operator to process the transaction, and the other transaction screens include: a product screen having product information relevant to the transaction, a weight screen having weight information for any product being weighed during the transaction, and a receipt screen having receipt information for the transaction and the receipt screen configured to receive a signature input from a customer of the transaction;
   receiving operator touches by the multi-touch input display within the transaction screen;
   producing weight information corresponding to a weight of a first item of the transaction on a top surface of the multi-touch input display by a load cell below the multi-touch input display and sending the weight information to the computer;
   capturing images of second items adjacent the top surface of the multi-touch input display by imagers around the multi-touch input display and providing the images of the second items to the computer, wherein some of the images of the second items contain barcodes; and sensing input selections and movements of fingers on the multi-touch input display and sensing objects placed on the multi-touch input display.

13. The method of claim 12, further comprising capturing a customer signature to complete payment by the multi-touch input surface and sending signature information to the computer.

14. The method of claim 12, further comprising capturing an image of a third item by one of the imagers while the one imager is operating in a handheld mode of operation and providing the image of the third item to the computer.

* * * * *